(12) United States Patent
Levitan (10) Patent No.: US 7,092,999 B2
(45) Date of Patent: Aug. 15, 2006

(54) DATA BROADCAST NETWORK FOR CONGESTION-FREE INTERNET ACCESS

(76) Inventor: Gutman Levitan, 101 Grove St. #11, Stamford, CT (US) 06901

( * ) Notice: Subject to any disclaimer, the term of this patent is extended or adjusted under 35 U.S.C. 154(b) by 858 days.

(21) Appl. No.: 10/165,537

(22) Filed: Jun. 10, 2002

(65) Prior Publication Data

US 2003/0229681 A1 Dec. 11, 2003

(51) Int. Cl.
G06F 15/16 (2006.01)
H04N 7/173 (2006.01)

(52) U.S. Cl. ...................................... 709/218; 725/109
(58) Field of Classification Search ................ 709/225, 709/218; 725/109
See application file for complete search history.

(56) References Cited

U.S. PATENT DOCUMENTS

| | | | | |
|---|---|---|---|---|
| 5,961,603 A * | 10/1999 | Kunkel et al. | ............... | 709/229 |
| 6,144,402 A * | 11/2000 | Norsworthy et al. | ........ | 725/109 |
| 6,240,555 B1 * | 5/2001 | Shoff et al. | .................. | 725/110 |
| 6,266,339 B1 * | 7/2001 | Donahue et al. | ............ | 370/432 |
| 6,522,342 B1 * | 2/2003 | Gagnon et al. | ............. | 715/716 |
| 7,010,426 B1 * | 3/2006 | Van Watermulen et al. | | 701/208 |
| 2002/0002709 A1 * | 1/2002 | An | .............................. | 725/109 |

* cited by examiner

Primary Examiner—Bunjob Jaroenchonwanit
Assistant Examiner—J. Bret Dennison
(74) Attorney, Agent, or Firm—Ilya Zborovsky (57) ABSTRACT

The invention is an Internet access system that puts together interactivity of the Internet and congestion-free content delivery inherent in broadcast media in order to reduce delays in content presentation. The system delivers any web object (web page, music file, video etc.) in two steps. First, a single copy of object is downloaded according to a standard Internet protocol into a server provided at a broadcast center no matter how many client computers have requested the object; then the copy is transmitted over a broadcast channel according to a data broadcast protocol so that all clients could download it simultaneously. A web object is transmitted as a flow of packets and the transmission is preceded with an announcement specifying a broadcast channel and a flow number. The packet header contains a flow number and a destination address that could be a client address or a broadcast address, thereby enabling an efficient handling of both one-to-one and one-to-many transmissions. The system provides, when necessary, a protection of transmitted content against unauthorized reception by biding packets identity and transmitting packets of the same content over different, pseudorandomly changing channels.

6 Claims, 9 Drawing Sheets

Transport Layer

BTP Header

Network Layer

BNP Header

Destination

BNP Header

Data Link Layer

Frame to Channel Server

Fig. 7

Frame from Channel Server

|  |  | Content Packets | | Announcement Packets | |
| --- | --- | --- | --- | --- | --- |
| Access | Cont. Categ. | BNP Destination | FLN | BNP Destination | FLN |
| Open | 1 | Client Address | =0 | Client Address | =0 |
| | 2 | Client Address | =0 | Client Address | =0 |
| | 3 | Broadcast Address | >0 | Broadcast Address | =0 |
| | 4 | Broadcast Address | >0 | Broadcast Address | =0 |
| Protected | 1 | Broadcast Address | >0 | Client Address | =0 |
| | 2 | Broadcast Address | >0 | Client Address | =0 |
| | 3 | Broadcast Address | >0 | Client Address | =0 |
| | 4 | Broadcast Address | >0 | Client Address | =0 |

Fig. 8

| L1 | L2 | URL | Chan Num | Flow Num |
|----|----|-----|----------|----------|

| L1 | L2 | URL | Chan Num | Flow Num | CHP | FLK |
|----|----|-----|----------|----------|-----|-----|

| L1 | L2 | URL | Chan Num | Flow Num | CHP | FLK | CHK |
|----|----|-----|----------|----------|-----|-----|-----|

DATA BROADCAST NETWORK FOR CONGESTION-FREE INTERNET ACCESS

BACKGROUND OF THE INVENTION

This invention relates to information technology for reducing Internet traffic and latency, and more particularly, to delivery of Internet content to users via television channels.

Initially Web latency was blamed on so-called "slow last-mile", i.e. connection to the Internet via dial-up phone modem and, as a result, cable and DSL modems have been developed for broadband access. However faster modems eliminate only one Internet bottleneck while grows of number of Internet users, popular portals and e-commerce create congestion beyond the "last mile". Moreover, faster modems intensify Web surfing and encourage rich media on Web sites, and thus contribute to Internet traffic on servers and routers. First DSL and cable modem users may experience a relief but if most of Internet users go this way the long waiting time will be back. An efficient way for reducing Internet traffic is Web caching, i.e. storing frequently accessed Web pages closer to users instead of fetching them each time from original distant sites whenever the pages are requested. Web caching reduces the number of routers between users and content servers and thereby reduces but does not eliminate traffic.

Most of content stored on Web is created for promotion of products, services and ideas, and therefore targeted at an audience rather than a particular person. And while by its nature the content is intended for broadcast it is delivered individually to each user like mail and phone calls. A separate copy of requested Internet content is delivered to each user on the user's address even when many users are interested in the same content. That is how dial-up, cable and DSL modems work. Such a waste of computing and communication resources creates Internet traffic jams that users see as annoying delays in content delivery. Meanwhile there is no traffic on radio and television where all recipients of a particular content are tuned to the same channel and thus receive the same "copy" of content. So this is the best and apparently the only way to eliminate Internet traffic and latency: delivery of Internet content to users in a broadcast manner.

This invention is further development of a data broadcast technology for the Internet disclosed in U.S. Pat. No. 5,864,823 and three pending patent applications by the same applicant. The technology puts together interactivity of the Internet and the traffic-free feature of television.

The U.S. Pat. No. 5,864,823 discloses new data broadcast applications Commercial on Demand and Virtual Personal Store that allow advertisers to effectively use the most pertinent consumer data for promotion of their products and services without having actual access to the data. The patent also claims a broadcast distribution of entities of informational nature, such as books, newspapers, magazines, music, video and software via a broadcast medium (television) to recipients individually authorized via an addressable network (the Internet). The pending application Ser. No. 09/179,375 claims a data broadcast system for reducing Internet traffic and latency. In the system, Internet files are delivered via the Internet to a broadcast server located at a television center and then retransmitted in a broadcast manner to simultaneously reach an unlimited number of clients in the servicing area. The files are automatically downloaded in client computers at a time of their scheduled transmission and presented to users later any time on user's request. In the pending application Ser. No. 09/336,846 the technology is developed to support interactive Internet access via multiple one-way TV channels. A client computer sends a request to the broadcast server for a particular content via a two-way addressable link, such as telephone, the server downloads the content via the Internet, selects a channel for broadcast transmission of the requested content and send the number of the channel back to the client. The client tunes to the channel and downloads the content. If more than one client order the same content they receive it simultaneously from the same channel. The pending application Ser. No. 09/829,255 discloses a further improvement of the data broadcast technology minimizing a two-way addressable interaction between broadcast server and broadcast clients and combining interactivity of the Internet with the traffic-free feature of television in the most efficient way.

Along with elimination of traffic and latency, the data broadcast technology turns on green light for rich media as feasible Internet content. On the Internet, all files storing images, audio and video are compressed to save storage and make transmission faster. Generally, the more compression, the faster transfer and the worth picture. As soon as storage capacity and delays are not issues any more, the compression can be limited to a level where it does not sacrifice resolution. With the traffic-free Internet, broadband connection and huge storage in client computer, users can enjoy HD video, surround sound and photographic quality picture. The quality of presentation is very important for both entertainment and e-commerce.

The data broadcast technology contributes also to Internet security eliminating possibility of so-called denial-of-service (DOS) attack. Popular sites may experience thousands and even millions of hits daily, and when they get too busy, additional requests are rejected to avoid excessive delays. This is called "denial of service". The DOS attack is a flood of artificially created traffic. The attack constitutes one of the greatest threats because victims have virtually no defense against it. The broadcast content delivery eliminates traffic no matter whether the traffic is natural or artificial and as a result, it eliminates a possibility of denial of service. Whatever is the flood of hits, only one copy of content is permanently transmitted over a TV channel so that every client could tune to the channel and download the copy.

With all those benefits the technology is supplemental rather than intrusive—it does not require any change in existent Internet infrastructure and standards. It is still user's choice how to access the Internet: via a dial up, a cable or a DSL modem, or via a broadcast client. However some Internet content intended for broadcast clients would be too "heavy" for the individual delivery via the modems. For example, it may take up to 7 hours to download a 1.5-hour movie over a cable modem.

At the same time, data broadcast creates a security problem: when information is distributed in a broadcast manner, everybody who has a receiver can be a recipient of that information. Meanwhile some content has to be protected against unauthorized reception because it is confidential or supposed to be paid. Encryption is the traditional way to secure a conditional (authorized) access but in such a widely open system as television it may happen to be not sufficient. In particular, cable TV providers complain that theft of service from scrambled premium and pay-per-view channels exceeds $5 billion annually. For that reason it is not a good idea for a telecommuter to access his company sensitive data over a cable modem even if the data is encrypted. Dial up and DSL modems are more secure because they deliver data over telephone, which is not a broadcast system. Lack of security may overweigh benefits of Internet access via a data broadcast network and therefore providing security in the network is an issue of paramount importance.

This invention presents a data broadcast network and a data broadcast protocol providing both open and conditional access to information transmitted over the network. The protection technique is originated in U.S. Pat. No. 5,280,497 by the same applicant. The patent discloses a protection of multichannel transmission based on a permanent pseudo-random redistribution of content channels among physical channels. The technique is an alternative or a supplement to encryption and, when combined with encryption, it creates a deadlock for attacker because neither of the two protections can be attacked before the other is defeated. In this application the technique is extended to packet-switching environment.

SUMMARY OF THE INVENTION

Accordingly, it is an object of the present invention to provide a data broadcast network for traffic-free Internet access. The broadcast network includes a local area network (LAN) at a multichannel television center connecting a broadcast server to channel servers which, in turn, are bridging the LAN to dynamic subnetworks comprising one-way broadcast channels and broadcast clients coupled to those channels via channel selectors. The LAN is connected to the Internet for downloading Internet files into the broadcast server according to the Internet protocol before the files are retransmitted via the broadcast network to broadcast clients according to a data broadcast protocol. The broadcast network supports both one-to-one and one-to-many transmissions, the latter as a simultaneous delivery of the same copy of file to many clients tuned to the same channel. Any file is transmitted as a flow of packets and each transmission is preceded with an announcement specifying a transmission channel and a flow number so that clients could download content selected by their users.

Another object is to provide an access control in the data broadcast network preventing unauthorized reception of information that is confidential or supposed to be paid. The network provides the protection hiding packets identity and transmitting packets of the same content over different, pseudorandomly changing channels thereby making packets of a particular content "lost" among other packets. The access control technique is an alternative or a supplement to encryption. When combined with encryption the technique creates a deadlock for attacker because neither of the two protections can be attacked before the other is defeated.

The novel features, which are considered as characteristic for the present invention, are set forth in particular in the appended claims. The invention itself, however, both as to its construction and its method of operation will be best understood from the following description of specific embodiments when read in connection with the accompanying drawings.

DESCRIPTION OF THE PREFERED EMBODIMENTS

Figure 1:
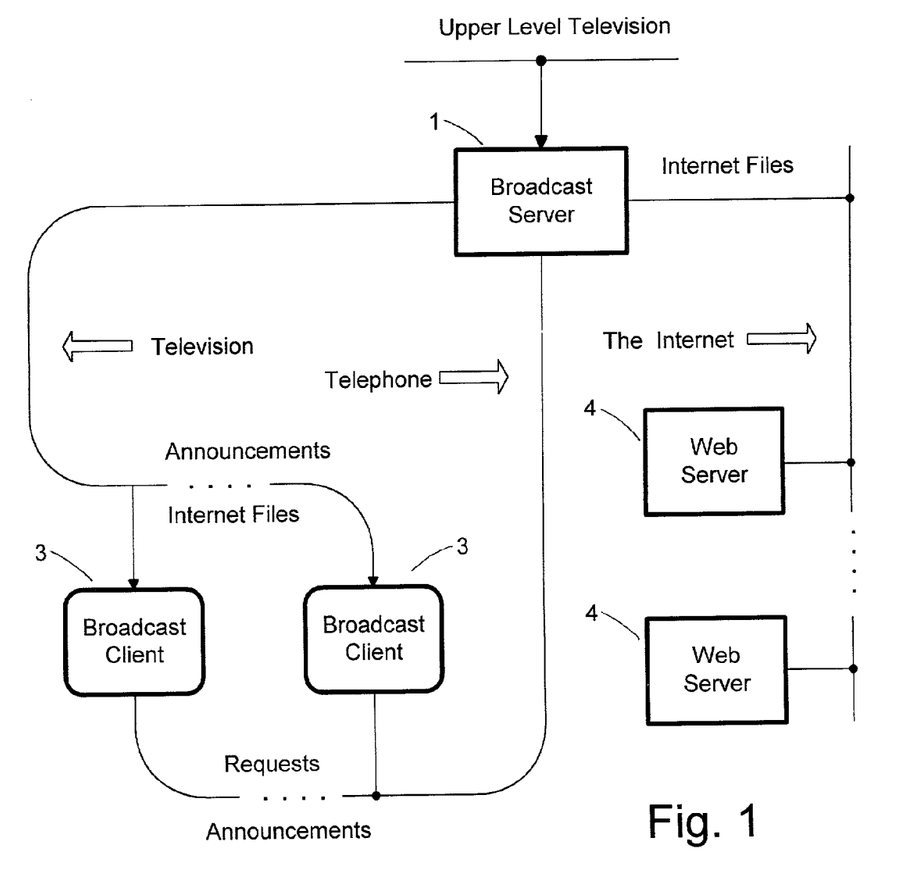
FIG. 1 is a block diagram of the Internet broadcast system.

FIG. 1 shows a block diagram of a data broadcast system providing Internet access. It comprises a broadcast server 1, which is an Internet server located at a television transmission center, and broadcast clients 3 located in the area serviced by the broadcast center. The broadcast server receives requests for Internet content from client computers via telephone and composes a selection list of Internet files that contains everything requested by clients and in addition, some other frequently requested files. The server downloads the files of the selection list from Web servers 4 via the Internet and retransmits them in a broadcast manner via a television medium such as cable, satellite or over-the-air terrestrial broadcast system. The server produces in advance an announcement of each file to be transmitted so that broadcast clients could automatically control channel selectors (tuner cards) connecting them to the television medium for downloading those files that are requested by their users.

It is important that Internet files are delivered via the Internet to a server located at a broadcast center and therefore may be scheduled for broadcast transmission from the server, not from origin Internet servers. Time of delivery of a web page from a server connected to the Internet anywhere in the world to a broadcast center in other part of the world is uncontrollable and even with no traffic can vary from a fraction of a second to a few seconds. Meanwhile one standard TV channel can transfer thousands of pages of text and hundreds of pictures per second. From the server at the broadcast center any file may be directed to any channel with no delay and, as a result, data flows can be evenly distributed among channels allocated for Internet broadcast. As a result, the system reaches its maximum performance using bandwidth of TV channels in the most efficient way.

The broadcast server may operate also as a client in a system covering a wider geographical area. For example, a server associated with a regional cable TV headend can receive some high-demand Internet files transmitted in a broadcast manner over a geostationary satellite (see FIG. 1). This is an efficient way to bypass traffic on Internet routers and this is how television programs are distributed to cable TV headends. On the other hand, a broadcast client may operate also as a server in a local or home area network. Then other computers in the network will be provided with benefits of traffic-free access without being connected to television and telephone.

The Internet broadcast system works in such a way that user receives any content of his choice at a time of his choice while the broadcast server divides Internet content into four categories depending on demand and delivery management:

(1) Content in low demand delivered from its origin server only when requested by a user.
(2) Content in medium to high demand cached on the broadcast server and delivered to users when requested.

(3) Content in high demand cached on the broadcast server and transmitted permanently during a certain period of time. Clients download the content "on the fly" without sending requests to the server.

(4) Content brought to the broadcast server at a certain time for transmission on a schedule so that all clients, whose users are interested in that content, could download it simultaneously. This content is automatically downloaded when transmitted and presented to user later on user's request at a time of user's choice.

This division permits to take full advantage of broadcast delivery while managing both one-to-one and one-to-many transmissions. Most of Web sites are visited only occasionally, if ever, and thus store content of the $1^{st}$ category. The content does not create much of Internet traffic but still benefits from broadband delivery over multiple channels. One standard 6 MHz TV channel has data transfer rate 27 to 40 Mb/sec, which is 1000 times faster than dial-up phone modem and 10 to 20 times faster than DSL. Cable modems do not switch channels, they deliver all content to all users over the same single channel. Therefore if, for example, 10 TV channels are allocated for broadcast data delivery then the Internet broadcast system is 10 times more efficient than a cable modem system—even for one-to-one transmissions.

So far the most efficient way to reduce Internet traffic has been Web caching. To reduce traffic and waiting time, Internet service providers are storing (mirroring) frequently accessed Web pages on their own servers instead of fetching them anew from original distant sites whenever the pages are requested by users. For content of the $2^{nd}$ category the Internet broadcast system combines the benefit of caching on the broadcast server with the benefit of broadband delivery over multiple TV channels.

However the major reason for data broadcast is handling one-to-many transmissions. On the Internet, each one-to-many transmission is currently carried out as a multitude of one-to-one transmissions: a separate copy of content is delivered to each client even when thousands of users are interested in the same content from the same source. That is how dial-up, cable and DSL modems work. With data broadcast, the same copy of content is simultaneously delivered to unlimited number of recipients. The broadcast may be done in two ways: as a permanent transmission of a high-demand content during a certain period of time or as a planned in advance transmission accordingly to a schedule. The broadcast server uses the former for content of the $3^{rd}$ category and the latter, for content of the $4^{th}$ category.

The $3^{rd}$ category content includes fast changing information such as breaking news, stock quotes, arrival and departure information from airports and so on. In addition, it may be pages of popular portals, search engines and e-retailers. During permanent broadcast, clients can get the content without sending requests to the server.

There are also cases when a web site suddenly and temporary attracts public attention. For example, NASA web site experienced several million hits shortly after the automatic laboratory landed on Mars. The broadcast server manages such a case by temporary changing the content category from $1^{st}$ or $2^{nd}$ to $3^{rd}$. When getting hits from many clients for a particular content, the server starts a permanent broadcast of the content for some period of time proportional to the number of clients requested the content. During that time an unlimited number of interested users receive the content while their computers do not send requests to the server. If after the time expiration the server gets hits again, it starts a new cycle of broadcast and so on. If the number of hits goes up the broadcast cycles get longer and if the number of hits goes down, the cycles get shorter. Eventually when users' interest is over, the server stops the broadcast.

The $4^{th}$ category content includes information of users' frequent interest such as news, weather, shopping and all kinds of personal accounts stored on web sites of banks, mutual funds, utilities and so on. It is also a high-volume content such as movies on demand, music, electronic books, catalogs and new versions of large software products. Scheduled transmissions take full advantage of Internet broadcast for two reasons. First, all clients, whose users are interested in certain content, download it simultaneously. Note that under immediate delivery, as opposite to scheduled one, a time shift in users' requests of the same content results in transmission of separate copies of the content. Second, the latest version of content is permanently stored on client hard drive and therefore is available for user immediately.

Unlike the content of $2^{nd}$ and $3^{rd}$ categories, the content of $4^{th}$ category is not stored on the broadcast server permanently: it is delivered from origin servers when updated and stored until the end of broadcast transmission. After broadcast, the storage occupied by a page is released and reused for other pages. That makes a big difference. For example, if a page is updated each hour and it takes in average about 3 seconds to bring the page over the Internet from its origin server to the broadcast server and a fraction of a second to broadcast the page over a TV channel, then the same amount of storage that would be needed for permanent caching of that page is enough to support broadcast transmission of 1200 similar pages.

This is, in fact, Internet caching on client side: content is downloaded simultaneously into many client computers when it is transmitted, not when requested, and presented instantly to users when requested. Hard disk drives currently used in digital video recorders can store dozens of hours of video, millions of still pictures, and billions of text and data pages. Although the new high-capacity storage is important, the Internet caching on client side is unfeasible without Internet broadcast over servers located at television transmission centers. If millions of Internet clients try to maintain current versions of Internet files on their own, i.e. requesting separate copies of pages directly from origin servers whenever the pages are updated, they would create a huge traffic clogging the Internet.

Under the planned delivery, clients, having their individual selection lists of Internet files, download the files of interest at the time of their scheduled transmission from the broadcast server replacing, if necessary, previous versions of the files by current ones. User composes his selection list of Internet content and client computer compares the list with a timetable of planned transmissions provided by the broadcast server. Client sends a request to the server for those and only those files of the user's selection list that are not included in the timetable. On the other side, the server schedules a periodical transmission of each requested file at least as frequently as the file is updated so that clients would always have the last version of the file downloaded, stored and presented to user instantly on user's request. Server continues the periodical transmission for a number of days proportional to a number of clients requested the file. During that time users receive the content while their computers do not send requests to the server. If after the time expiration the server gets requests again, it starts a new cycle of broadcast and so on. If the number of requests goes up the broadcast cycles get longer and if the number of requests goes down, the broadcast cycles get shorter. If no requests are submitted, the server terminates the transmission until a new request for that content comes up.

Figure 2:
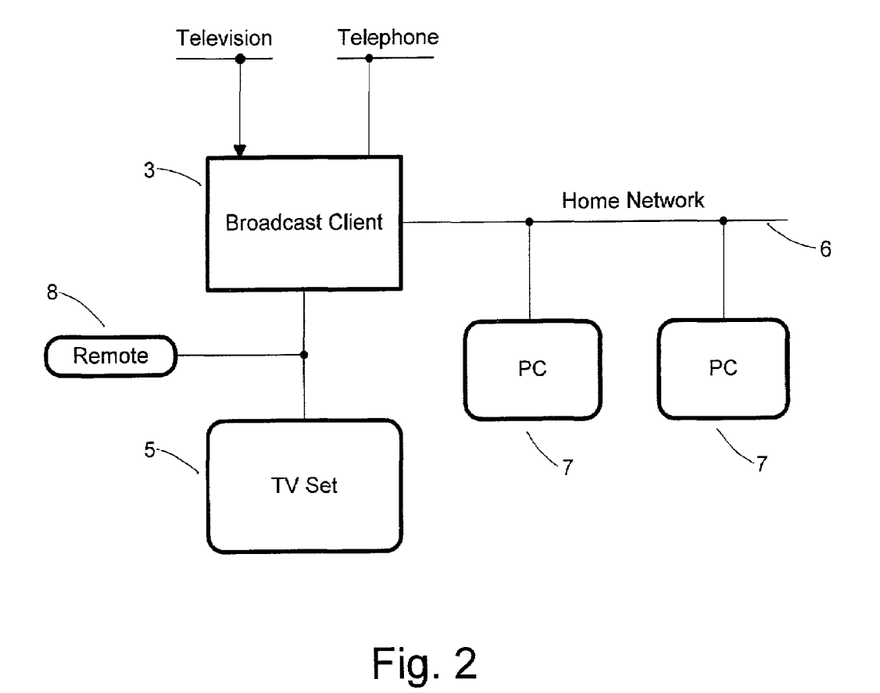
FIG. 2 is a block diagram of home network served by a broadcast client.

FIG. 2 shows a block diagram of a home network with a broadcast client operating as the server of the network. The broadcast client 3 is a cable box or a satellite receiver combined with a computer equipped with a high-capacity hard disk drive. The broadcast client is connected to both television and telephone. It is connected to a TV set 5 in order to output both conventional television programs and content delivered from Internet sources. One or more desktop computers 7 with keyboards, printers and scanners are connected to the broadcast client via a home network 6, wired or wireless, and therefore, the desktops may be located anywhere in the home and do not need to be connected to television or telephone. The desktops don't need a large hard drive or any hard drive at all because they can use the huge storage of the broadcast client 3, which is their network server. They also don't need a large monitor and high quality speakers because TV set 5 is better for presenting rich media content.

The integrated system illustrated by FIG. 2 provides the most comprehensive user's interface to conventional television, interactive television and the Internet. While desktop PC monitor is better positioned than TV screen for presenting content that is predominantly text, large TV screen is better for presenting content that is predominantly picture or video. User may click on links with a remote control handset 8 but it is definitely more convenient to type web addresses and compose selection lists of web sites sitting at the desk with a keyboard and mouse. You may check e-mail while TV screen runs a commercial but you prepare and send e-mail using your desktop. And anyway, everybody needs a TV set for entertainment and a PC for computer applications beyond Internet access.

Figure 3:
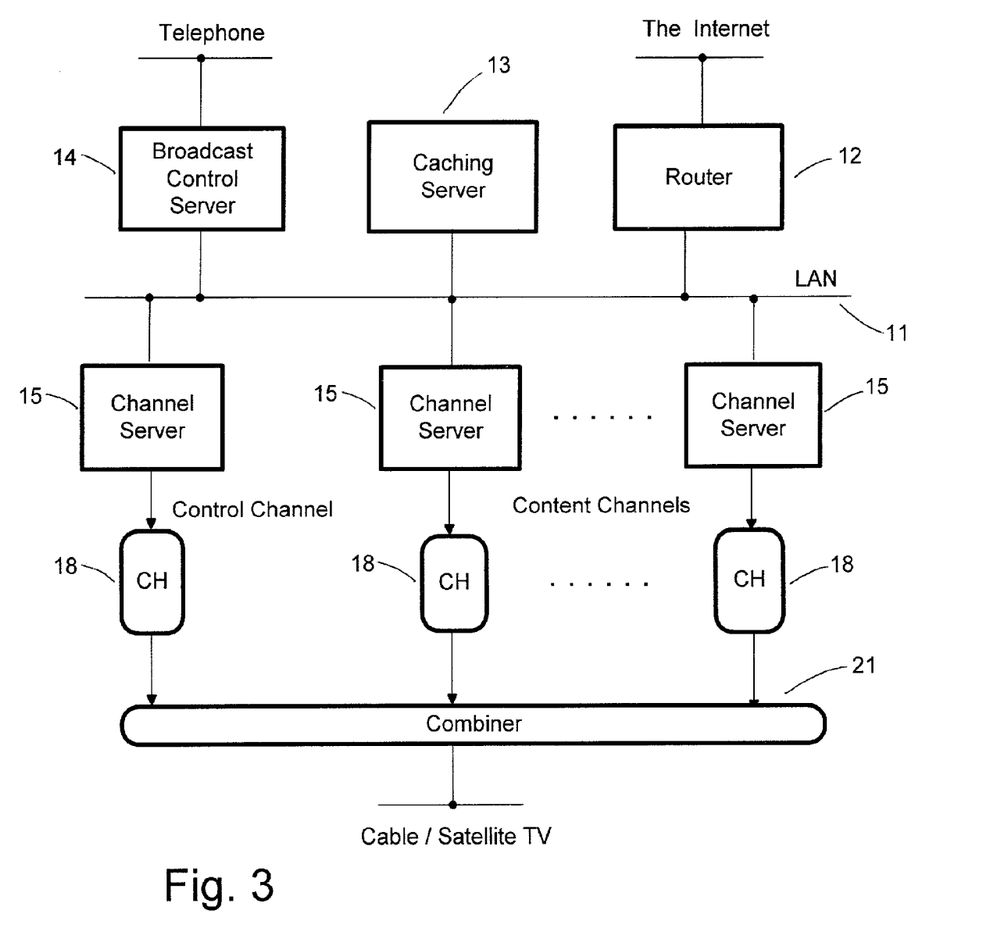
FIG. 3 is a block diagram of server side of the data broadcast network.

The server side of the data broadcast network is illustrated by FIG. 3. It comprises a number of computers at a television broadcast center connected in a local area network 11. The LAN is connected to the Internet via a router 12. Functionally the computers are divided into three groups: caching server 13, broadcast control server 14 and channel servers 15. The broadcast control server receives clients' requests for Internet content over a telephone line and composes a server selection list of Internet files containing all objects requested by clients and, in addition, some other frequently requested files. It passes the selection list to the caching server that download files included in the list from their origin servers connected to the Internet throughout the world. The broadcast control server decides at what time the files will be downloaded, how long stored in the caching server and to which channels directed for broadcast transmission. The function of channel sever 15 is reception of data from the caching server 13 and the broadcast control server 14, and forwarding the data to a television channel 18 to which the channel server is connected.

One standard 6 MHz TV channel transfers 27 Mb/s with 64 QAM modulation or 40 Mb/sec with 256 QAM modulation. The QAM, quadrature amplitude modulation, is a modulation technique used for digital television and cable modem. To match the speed, the server side of the data transmission network needs a high-performance LAN connected to the Internet over a high-end router. Traditional Ethernet, the most commonly used for LANs, transfers 10 Mb/s and therefore cannot keep busy even one TV channel. Fast Ethernet (100 Mb/s) can serve only 2 to 3 channels while Gigabit Ethernet can support a non-stop data transmission on 20 to 30 channels. If it is not enough, 10-Gigabit Ethernet will keep busy 200 to 300 channels. However the channel servers 15 divide the network into slower 27 to 40 Mb/sec broadcast domains and as a result, on client side Fast Ethernet equipment will provide more than needed bandwidth and even the speed of traditional 10 Mb/s Ethernet may be enough under certain restrictions being imposed.

Figure 4:
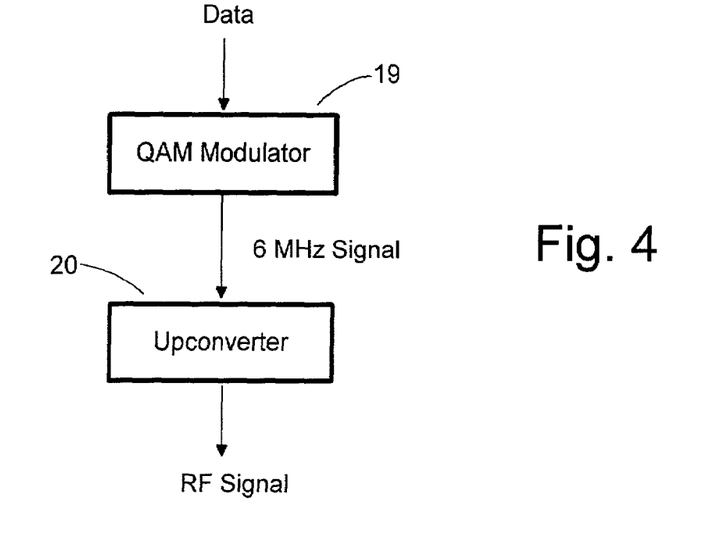
FIG. 4 is a block diagram of the data broadcast channel.

The channel server is a computer connected over a network interface card (NIC) to the LAN and over a serial port to the input of a television channel in order to forward data received via the LAN to the input of the television channel. The input (FIG. 4) is a QAM modulator 19 that transforms a stream of pulses carrying digital data into a modulated 6 MHz intermediate analog signal. The signal goes further to an upconverter 20 to modulate a RF frequency allocated to the channel. Then all RF signals are mixed in a combiner 21, shown on FIG. 3, and the mixed signal is transmitted over a cable plant or a satellite in order to reach recipients located in the servicing area.

Figure 5:
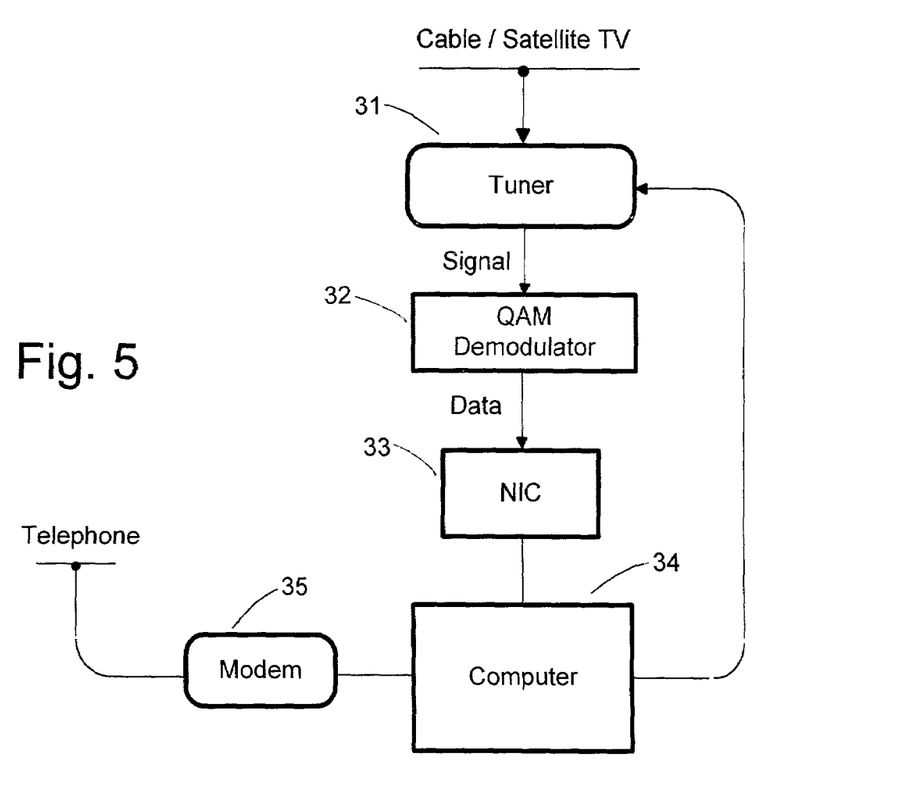
FIG. 5 is a block diagram of client side of the data broadcast network.

The client side of the data broadcast network is illustrated by FIG. 5. A client computer 34 is coupled to the cable or satellite transmission medium over a tuner 31, a QAM demodulator 32 and a NIC 33. The tuner is controlled by the client computer and operates as a channel selector. The QAM demodulator transforms the modulated analog signal into a stream of pulses carrying digital data processed by NIC.

The NIC is a network adapter installed in a computer for providing the connection point to a network. NICs are defined by physical and data link layer specifications and have unique hardwired addresses called MAC addresses. (MAC stands for Media Access Control). When a computer sends an Ethernet frame to other computer on the same network, it places the MAC address of the destination computer in the frame. While all devices on the network detect this frame, only the target computer actually receives it. If an Ethernet frame is addressed to all devices on the network, a special broadcast address is placed in the frame. The address consists of all binary 1s. When a frame with this destination address is transmitted over a network, all devices on the network receive the frame. So far broadcast messages have been used mainly for network management and diagnostic purposes. However in the data broadcast network, frames with the broadcast destination address are sent to deliver Internet content to many clients simultaneously.

The client computer is connected also to a telephone line via a modem 35 for two-way communication with the server, in particular, to send requests for Internet content to the server. The content itself however is transferred to the client over TV channels, not over the phone line, and that makes potentially a big difference. On the Internet, every document is identified by its Uniform Resource Locator (URL) that includes a host name, a directory of files and a file name. A number of bits required for an URL transmission, although bigger than for a phone number, is still small enough to go from a client to the server in the same way as a phone number does, i.e. without establishing an actual connection over switched circuits necessary for voice transmission. Phone numbers are transmitted accordingly to a message-based SS7 protocol via a system known as CCS (Common Channel Signaling). The CCS is a separate data network laid over a carrier's switching network for transmission of dial tones, bell signals, busy and ring-no-answer signals. In addition to the call setup part of phone call, CCS provides advanced services such as 800 numbers, call waiting, call forwarding, three-way calling, voice mail and caller ID display. With client requests carrying over the CCS, user will not need a separate phone line for Internet access because an actual connection via switching circuits, which makes a phone line permanently busy, will be necessary only for sending long e-mail messages or uploading files attached to e-mail. (Incoming messages and attached files will be transmitted via television channels, not via the phone line). In addition, Internet service provider will not need to pay for local phone numbers because CCS services are paid on a flat fee basis. That makes the data broadcast access cost-effective for both users and service providers. Some users however will prefer to be connected to local numbers even paying more because they like to chat or exchange music and video with others.

Note that a cable TV system upgraded for cable modems has already an upstream link and therefore does not need a telephone connection at all. In the data broadcast network the link can transfer requests from clients to the broadcast server, send e-mail and upload files.

In the Internet access network described above, Internet content is delivered first to the broadcast server at a broadcast center according to the Internet protocol, known as TCP/IP, and then to broadcast clients in the servicing area accordingly to a data broadcast protocol described below. Note that it is a protocol for a new access system, not a revision of existing Internet standards.

In any conventional data communication network including the Internet, a computer receives data because the data is sent to its network address. In a broadcast network such as radio and television, a receiver gets information because it is tuned to a channel over which the information is transmitted. The data broadcast protocol is designed in such a way to address the fundamental difference and, at the same time, to be as close as possible to the Internet protocol.

In a data communication network, any file is fragmented into packets and delivered as a flow of packets to a destination address included in each packet. In the broadcast network, any file is also delivered as a flow of packets but not necessarily to a particular client but to an unlimited number of clients simultaneously. Accordingly, the flow is directed not to a client but to one of broadcast channels. To receive a content, client needs to know on which channel the content will be transmitted. And because each channel is concurrently carrying many flows, the client, in addition, has to be able to recognize packets of content requested by its user among all other packets.

In order to meet the requirements, the broadcast control server (FIG. 3) produces an announcement of content to be transmitted. The announcement contains a URL (Uniform Resource Locator) identifying the content on the Internet, a channel number and a flow number. The announcement is encapsulated in an announcement packet. For open access, announcement packets are transmitted over a default control channel known to clients. Client is tuned to the control channel when waiting for an announcement with the URL requested by its user. Then it switches to the channel specified in the announcement and selects content packets belonging to the specified flow. Note that the control channel may transmit both announcement packets and content packets.

Figure 6:
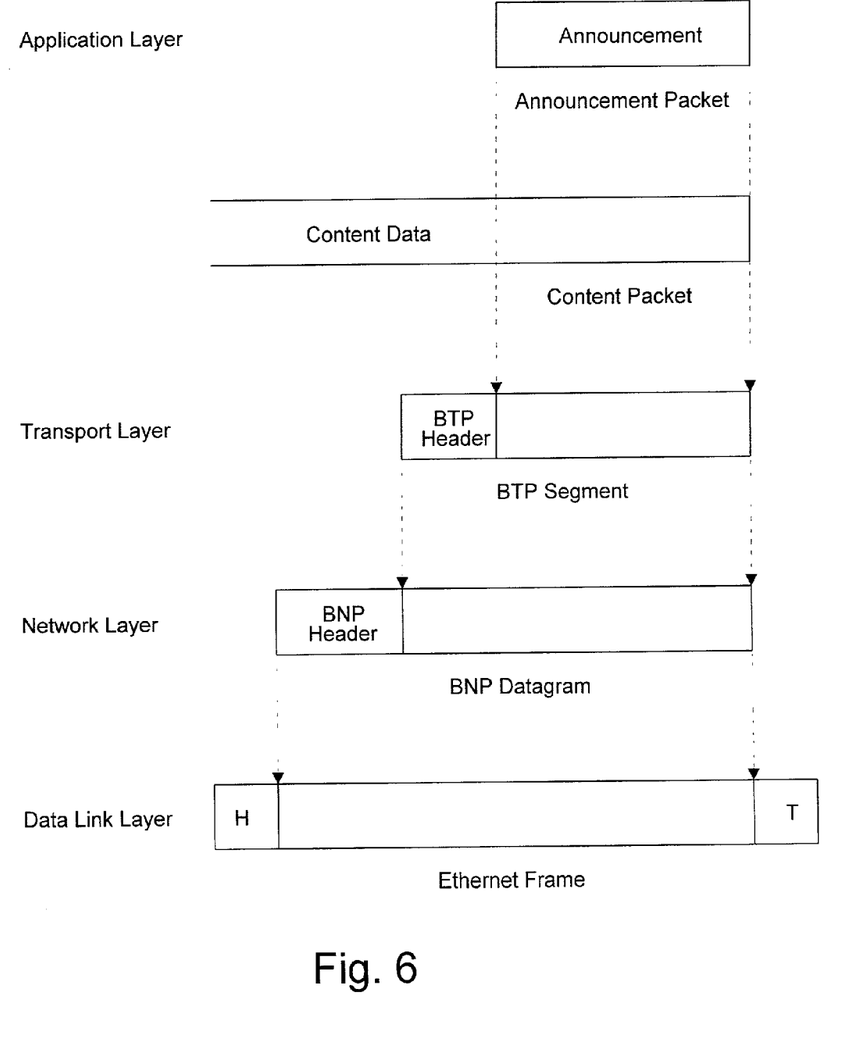
FIG. 6 is a view of layers of the data broadcast protocol.

Similar to the Internet protocol the data broadcast protocol is split into four layers: application layer, transport layer, network layer and data link layer (FIG. 6). Announcement packets and content packets from application layer are encapsulated in Broadcast Transport Protocol (BTP) segments, which, in turn, are encapsulated in Broadcast Network Protocol (BNP) datagrams and, finally, BNP datagrams are encapsulated in Ethernet frames. The layered system, originated in an international standard known as ISO OSI reference model, was designed to provide interoperability and independence from hardware and software platforms. In the data broadcast protocol the layered architecture is used to address the specifics of broadcast data delivery in the transport and network layers only while keeping protocols in the application and data link layers intact. As a result, the system can work with existing web browsers, e-mail and other Internet software of application layer, and use standard Ethernet software and hardware at the data link and physical layers.

The transport layer protocol is responsible for data exchange between applications run on different computers. Transport Control Protocol (TCP) is the transport layer protocol for the Internet. It is a connection-oriented protocol that provides the flow controls and reliable data delivery. But it is not always necessary. For example, lost or corrupted packets are not recovered in audio and video streams. So another transport layer protocol, User Datagram Protocol (UDP) was created to provide a very simple network interface for Internet applications that do not need all TCP services. There are several Internet protocols that provide some but not all of TCP services but more than UDP does. An example is RTP (Real-time Transport Protocol).

The Broadcast Transport Protocol (BTP) of the data broadcast network is built on the top of UDP. The UDP header provides a source port, a destination port and a checksum. Both ports are software "ports" that identify different application processes. In fact, a port is a message queue in which packets to be processed by a certain application program are placed. For example, in an announcement packet the BTP source port identifies an application in the broadcast control server that produces announcements and the destination port identifies an application run by each client to process the announcements. In a content packet the source port identifies an application in the caching server that produces that kind of packets and the destination port identifies an application run by each client to process that kind of content. The checksum contains an error-checking value to ensure the integrity of the UDP segment.

The BTP segment header (FIG. 7) contains the UDP information and in addition, a packet sequence number (SqN), a more packets indicator (MPs) and a single transmission indicator (ST). The additional information is used for error handling, which is different for different types of content.

The single transmission indicator (ST) is ON for content of the $1^{st}$ and the $2^{nd}$ category, and OFF for content of the $3^{rd}$ and the $4^{th}$ category. The ST ON means that content is transmitted only once. If a packet is corrupted or lost and the ST is ON, client sends a request to the server via the telephone modem for retransmission of that particular packet identified by its sequence number (SqN). The ST OFF means that content is transmitted more than one time and therefore clients do not need to send requests to the server for lost or corrupted packets; instead they take the packets from the next transmission. Content of the $3^{rd}$ category is transmitted repeatedly and permanently, i.e. more than once. Functionally, the $4^{th}$ category content may be transmitted once at a time but for error correction purposes it is transmitted two or more times depending on an error level in the broadcast transmission line. It is still better than multiple transmissions of the same content on the Internet where a separate copy is delivered to each user and so are lost and corrupted packets.

Unlike TCP, BTP does not handle the flow control because in the broadcast network the broadcast control server takes care about packet flows over the LAN and TV channels.

A network layer protocol is responsible for end to end packet delivery across multiple router-connected networks.

The Internet Protocol (IP) is the network layer protocol for the Internet. IP is a routing protocol: its primary task is to support internetwork addressing and packet forwarding. IP datagram header contains Internet addresses of source and destination computers.

There are no Internet routers inside of the data broadcast network (FIGS. 3, 5). However the network is divided by the channel servers into separate broadcast domains, one for each channel allocated for data broadcast transmission. A client computer may be connected to any of the domains but only to one at a time (if the client has only one tuner). Therefore each of the broadcast domains may be considered as a separate subnetwork of client computers currently connected (tuned) to the broadcast channel.

Broadcast Network Protocol (BNP) is the network layer protocol of the data broadcast network. It is responsible for packet delivery from the broadcast server to broadcast clients across the LAN and the channel subnetworks. BNP datagram header (FIG. 7) contains a source address and a final destination address. Both of them are not Internet addresses but rather Ethernet addresses. The destination address may be a client MAC address or the broadcast address. The source address is used when a client asks the server to retransmit a lost or corrupted packet.

BNP datagram is pushed down to the data link layer where it is encapsulated in an Ethernet frame. When the frame leaves the caching server its destination address is the LAN address of a channel server. The channel server creates a new frame with the destination address taken from the BNP header, which is a client address or the broadcast address, and forwards the frame to the broadcast channel. Thus the channel server operates as a bridge connecting the LAN with the subnetwork of client computers currently tuned to the broadcast channel.

In addition to the source and destination addresses the BNP header contains a flow number. Client computer connected to a channel uses the flow number to separate packets carrying content requested by its user from all other packets transmitted over the channel with the broadcast destination address. The flow number is equal zero if BNP destination address is a client address, not the broadcast address. It is also zero for all announcement packets no matter what is the BNP destination address. Client is looking for an announcement of content requested by user and the content is identified by URL included in announcements.

Figure 7:
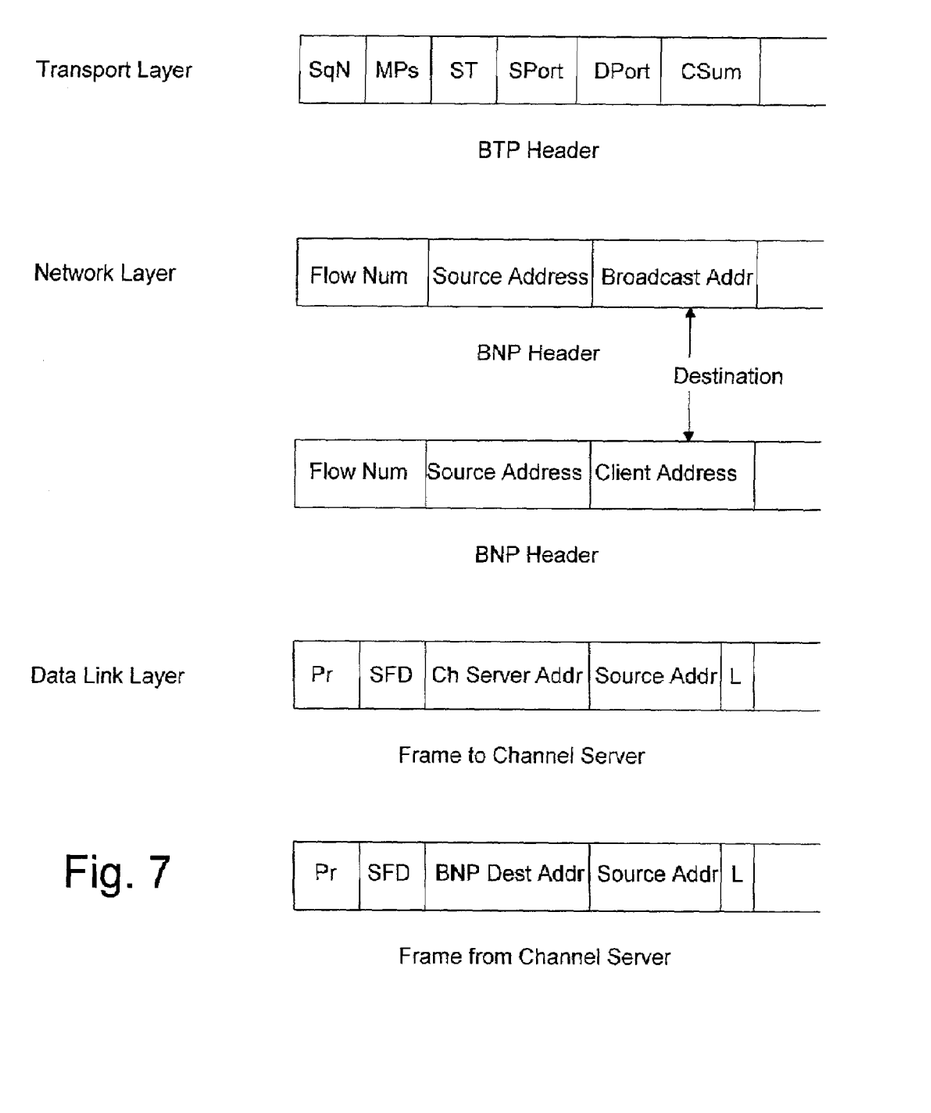
FIG. 7 is a layout of packet headers according to the data broadcast protocol.

A data link layer protocol defines the rules for sending and receiving information across a physical connection. Data is packaged into frames for transport across the underlying physical network. The Ethernet frame consists of header, data and trailer. The data broadcast protocol uses Ethernet frames to carry BNP datagrams as encapsulated data (see FIG. 6). Accordingly to IEEE 802.3 standard the header of Ethernet frame consists of a preamble, a start frame delimiter, a destination address, a source address and a length field that indicates the number of bytes in the data portion of the frame (FIG. 7). In each frame sent from the caching server and the broadcast control server, the destination address is the LAN address of a channel server. The channel server creates a new frame with the destination address taken from the BNP header and uploads the frame into the broadcast channel.

The address is a client MAC address or the broadcast address. When a frame with a client destination address is transmitted over a broadcast channel, only a computer tuned to the channel and having the MAC address hardwired in its Ethernet adapter (NIC) receives the frame (FIG. 5). The broadcast address consists of all binary 1s. When a frame with the broadcast destination address is transmitted over a broadcast channel, all clients connected to the channel receive the frame.

If a frame is accepted by NIC 33, the BNP datagram encapsulated in the frame is checked by client computer 34. The computer accepts datagrams with a certain flow number and discards all other datagrams. The flow number is obtained from the announcement of content requested by user. The number is zero, if the datagram has a client destination address, and more than zero if the datagram has the broadcast destination. Note that while many different content flows transmitted over the same channel may have zeroed flow number, only one of the flows is accepted by NIC and passed to the client computer, namely, the flow of frames with the destination address of the NIC. Thus the broadcast client accepts packets of content requested by user while all other packets are blocked in one of three layers (FIG. 5). At the physical layer, the tuner 31 excludes all packets transmitted on channels other than that specified in the announcement. At the data link layer, all packets with destination addresses of other clients are ignored by the NIC 33. And at the network layer, all packets with a flow number different from that specified in the announcement are discarded by client computer 34.

Some content has to be protected against unauthorized reception because it is confidential or supposed to be paid. Encryption is the traditional way to secure a conditional (authorized) access but in such a widely open broadcast system as television it may happen to be not sufficient. An access control technique described below prevents unauthorized access making transmission information (channel number and flow number) and the fact of transmission itself known only for authorized broadcast clients. The technique is an alternative or a supplement of content encryption. When combined with a content encryption, it creates a deadlock for attackers. In order to start a cryptoattack a perpetrator needs, as a minimum, encrypted data and the data is not available. At the same time, encryption does not permit to take advantage of some kind of resemblance between parts of the same content broken into packets for matching the parts and putting them together. In other words, any of the two protections cannot be attacked before the other is defeated.

The new access control technique provides three levels of protection referred herein as hiding announcements, flow hopping and channel hopping. A level of protection applied to transmission of a particular content depends on importance of the protection. However each level makes sense if it incorporates the previous one as a prerequisite.

Figure 8:
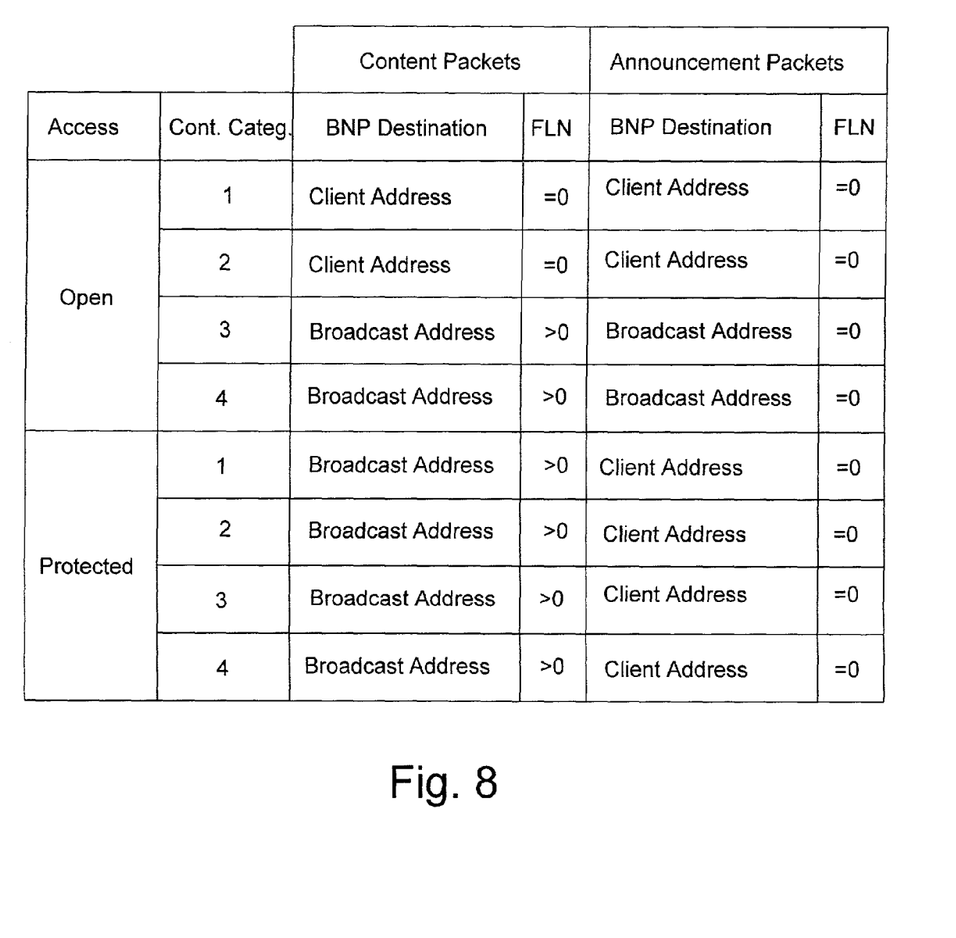
FIG. 8 is a table of security related features of the data broadcast protocol.

FIG. 8 shows a table that illustrates security-related features of the data broadcast protocol. In the broadcast network any content is delivered as a flow of content packets transmitted over a broadcast channel. The content may be open for all clients or it may be protected, i.e. intended for authorized clients only. In addition, a transmission may be intended for one client at a time (content of the $1^{st}$ and $2^{nd}$ categories) or for many clients simultaneously (content of the $3^{rd}$ and $4^{th}$ categories). As the table shows, packets of open content sent to a single client have the client address as the BNP destination. However any packet of a protected content has the broadcast destination, even if the content is intended for one client only, because a client destination address identifies the packet as a part of a certain content sent to a certain client while the broadcast destination makes the packet anonymous. Packets of any content sent to a client address have the flow number set to 0. To receive a content sent to a broadcast destination, a client needs to know a unique combination of channel number and flow number. The access information is included in an announcement, which is an application layer message. For an URL, which identifies content on the Internet, the announcement provides a channel number and a flow number. The message is transmitted accordingly to the layered data broadcast protocol. As the table shows, an announcement of unprotected content requested by one client only (content of the $1^{st}$ and $2^{nd}$ categories) is sent to the client address. The announcement packet may be sent via the control TV channel or via telephone, in particular, the telephone signaling system. An announcement of unprotected content intended for more than one client (content of the $3^{rd}$ and $4^{th}$ categories) is transmitted via the control TV channel with the broadcast address so it could be received by all clients.

For protected content, it is different. The first step of protection is delivery of a separate copy of announcement individually to each authorized client. The announcement packet, having a client destination address in the BNP header, is delivered to each client via telephone. In addition, the announcement message may be encrypted by the client public key. If the data broadcast is implemented in a cable television system upgraded for a cable modem, the system is supposed to work without telephone. In such a case, all announcements are transmitted via the control TV channel and the public/private key encryption is the only way to protect the access information when necessary. The flow number is zero for all announcement packets because client is looking for an announcement of content requested by user and the content is identified by URL included in announcements.

Figure 9:
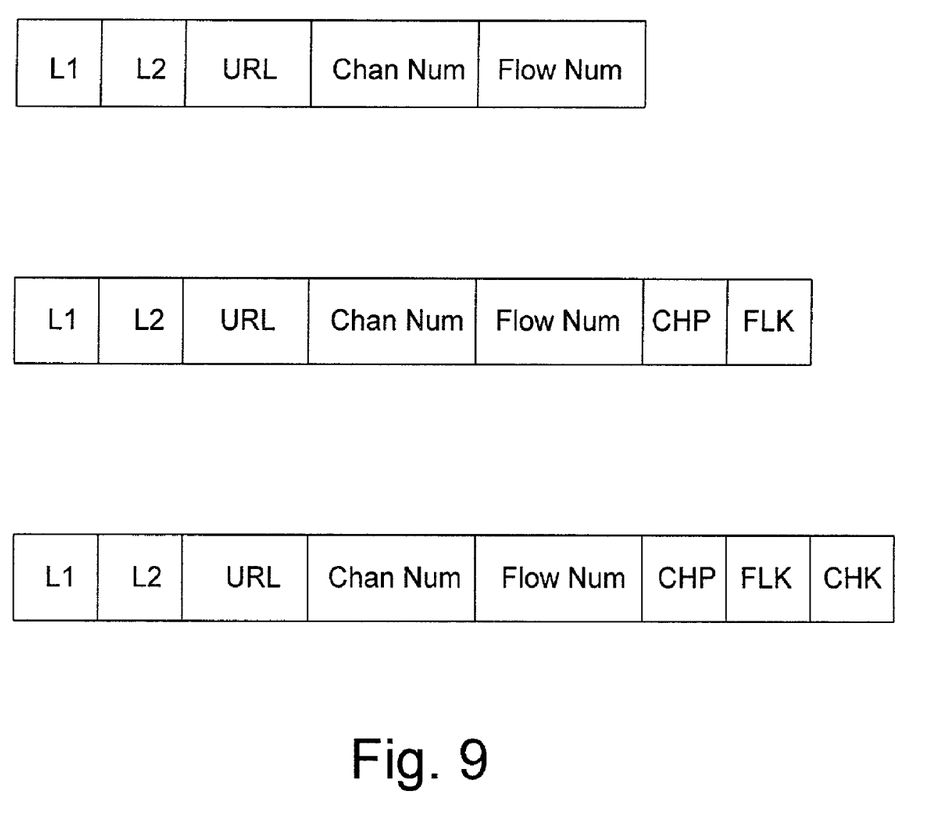
FIG. 9 is a layout of announcement message.

The announcement message is illustrated by FIG. 9. The message contains URL, channel number, flow number and, because URL has a variable length, the URL length L2 and the whole message length L1. Hiding announcements from unauthorized recipients is the first step of content protection. However it does not prevent a serious perpetrator from looking for a content of interest by downloading many "unknown" content flows. The perpetrator can do it selecting content packets with the same flow number transmitted over the same channel. Two methods described below close the vulnerability window. The first method consists in changing identity of content packets in a secret way. It is achieved by including different, pseudorandomly changing flow numbers in packets of the same content. The second method consists in transmission of packets of the same content on different, pseudorandomly changing channels. The first method is referred herein as flow hopping and the second, as channel hopping.

A pseudorandom succession of numbers is generated by a process determined by a secret key. The process is synchronously run on both server and client sides. The "pseudorandom" means random (chaotic) for unauthorized clients while completely determined for authorized clients supplied with the secret key. An example of pseudorandom generator is drand function in the library of C programming language. Let 1 to N be the range of flow numbers assigned to concurrent transmissions of different data files and media streams over the same channel. When a transmission is over, a flow number of the transmission is released and may be assigned to a new transmission. The flow numbers are assigned independently on each channel, i.e. the same flow number may be assigned to different files if the files are transmitted on different channels. The N is used as a parameter of a program that generates a pseudorandom succession of numbers in the range 0 to N−1. The succession looks, for example, like 2, 18, 35, 35, 92, 0, . . .

Another parameter of the generator is a secret key: for different values of the key the generator produces different pseudorandom successions. Let I be a virtual flow number included in the announcement and S be a variable that takes values from the pseudorandom succession. Then a variable flow number J included in BNP header of content packets will be computed as following:

if $I+S<=N$ $J=I+S$ else $J=I+S-N$.

In other words, J is the result of a pseudorandom circular shift applied to I. For example, for N=100 and S generated as shown above, packets of a content announced with the virtual flow number 25 will be actually transmitted with the hopping flow numbers 27, 43, 60, 60, 7, 25, . . .

while packets of a content announced with the virtual flow number 26 will be transmitted with the flow numbers 28, 44, 61, 61, 8, 26, . . .

When the flow-hopping protection applies to a transmission, the announcement of the transmission (FIG. 9) contains a virtual flow number, a key to a process generating variable flow numbers FLK and a current hop position CHP. The pseudorandom generator at the server side produces different successions for different FLK values. The generator is restarted from time to time with the same or different key. When a client receives an announcement, the generation at the server side is in progress and therefore client needs to know not only the key but also a current position in the generated succession to catch up with the process in the server. The current hop position CHP provides the information.

The next level of protection is achieved with transmission of packets of the same content on different, pseudorandomly changing channels. The broadcast on hopping channels is illustrated by a diagram of FIG. 10. The broadcast network contains two lines of channel servers connected via a data link layer switch 16. The upper line represents virtual channels and the lower line represents physical channels. The virtual-level servers 15 are connected to the switch inputs and the physical-level servers 17 are connected to the switch outputs. The switch can direct packets from any input to any output depending on destination address included in the Ethernet frame header. A flow of packets carrying a certain content is sent from the caching server to a certain virtual channel. The switch however directs packets of the flow to different physical channels in a pseudorandom order determined by a secret key. At receiving end, each client, supplied with the key, reproduces the order and switches its tuner to the different physical channels to follow the hopping virtual channel.

Figure 10:
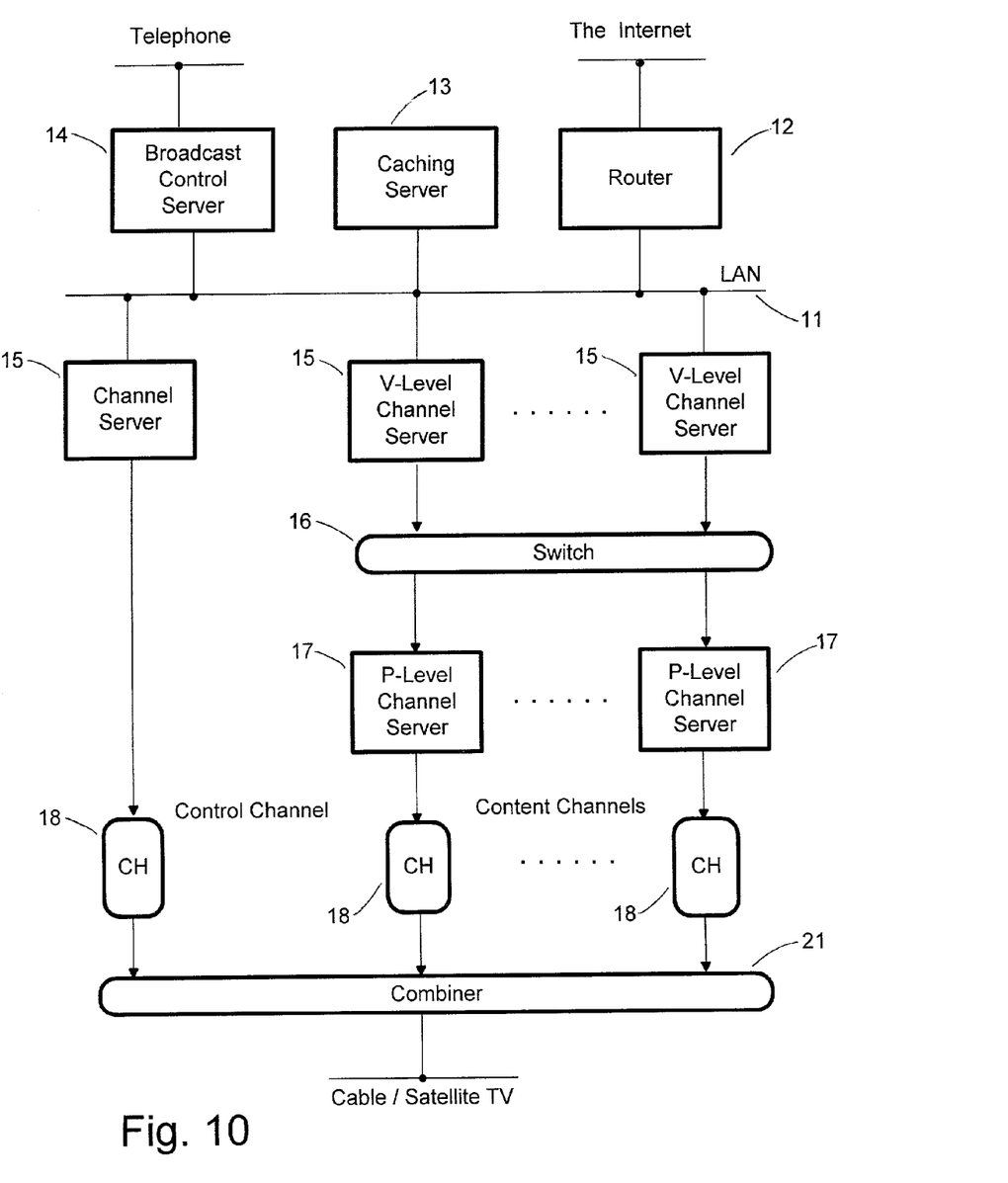
FIG. 10 is a block diagram of secure data broadcast network.

When a frame leaves the caching server, its destination is the network address of a v-level channel server 15. The server replaces the address by a network address of a p-level channel server 17. The new address is determined by a pseudorandom process and is changing in time. The switch 16 directs the frame to the p-level server that, in turn, replaces the server address by the broadcast address and uploads the frame into the channel 18 to which the server is connected.

The dynamic pseudorandom redistribution of virtual channels among physical channels is managed by the broadcast control. All TV channels included in a hopping channels group are mapped to relative channel numbers 1 to M, no matter what numbers are assigned to the channels in the television system. The M is used as a parameter of a program that generates a pseudorandom succession of numbers in the range 0 to M−1. The succession looks, for example, like 2, 8, 3, 3, 6, 0, . . .

Another parameter of the generator is a secret key: for different values of the key the generator produces different pseudorandom successions. Let S be a variable that takes values from the pseudorandom succession. Then all packets from a virtual channel I will be directed to a physical channel J defined as following:

if $I+S<=M$ else $J=I+S-M$.

For example, for M=10 and S generated as shown above, all packets sent to virtual channel 5 will be directed to physical channels 7, 3, 8, 8, 1, 5, . . .

while all packets sent to virtual channel 6 will be directed respectively to physical channels 8, 4, 9, 9, 2, 6, . . .

The broadcast control generates the pseudorandom succession and passes consecutive values of the variable S to all v-level servers. Each v-level server computes a physical channel number J as the function of S and its own relative number I. All network addresses of p-level servers are mapped to the relative channel numbers, so the next destination address is obtained from the map.

In order to follow a virtual channel, an authorized client uses the channel map to get the relative number of the virtual channel, computes the relative number of physical channel, uses the channel map again to get the number of the physical channel in the television system and passes the number to the channel selector.

When the channel-hopping protection applies to a transmission, the announcement of the transmission (FIG. 9) contains a virtual channel number, a channel hopping key CHK along with a flow hopping key FLK and a current hop position CHP, which is the same for both channel and flow hopping. The pseudorandom generator at the server side produces different successions of channels for different CHK values. The generator is restarted from time to time with the same or a different key. When a client receives an announcement, the generation at the server side is in progress and therefore client needs to know not only the key but also a current position in the generated succession of channels to catch up with the process in the server, and the CHP provides the information.

While certain novel features of this invention have been shown and described and are pointed out in the annexed claims, it will be understood that various omissions, substitutions and changes in the forms and details of the devices illustrated and their operation can be made by those skilled in the art without departing from the spirit of the invention. In particular, the content transmitted from the broadcast center to broadcast clients is not necessarily originated on the Internet; it may be stored on CD ROMs and DVDs delivered to the broadcast center. Data may be transmitted over the network as data files or non-stop media streams. The broadcast medium is not necessarily television, it could be a high-frequency radio while two-way addressable interaction between client and server may be provided over cellular phone, pager or any other addressable communication link.

I claim:

1. An Internet access system reducing Internet congestion and latency comprising:
   a broadcast multichannel medium for transmitting data in a broadcast manner;
   a multichannel data transmitter provided at a transmission center and connected to the broadcast multichannel medium;
   a local area network provided at the transmission center and connected to the Internet over a router;
   a caching server connected to the local area network for downloading web objects from their origin web servers according to a standard Internet protocol;
   wherein entire web objects are downloaded into the caching server before the objects are forwarded to Internet clients;
   at least one channel server connected to the local area network and further connected to a channel of said multichannel data transmitter;
   said channel server being operative for receiving a web object from said caching server over said local area network;
   transforming the web object into a flow of content packets to be transmitted over the channel;
   including a flow number into a header of content packet; and
   uploading the packets into the channel, thereby providing a broadcast transmission of web object over the channel as a flow of packets with the same flow number;
   two-way communication means for transmitting data between devices connected to the two-way communication means by directing data to addresses assigned to the devices;
   a broadcast control server connected to the two-way communication means for receiving requests for web objects from Internet clients and further connected to said local area network for communicating with said caching server and said channel servers;
   said broadcast control server being operative for maintaining a server selection list of web objects requested by Internet clients and not transmitted yet to the clients;
   instructing said caching server to download a single copy of each web object included in the server selection list no matter how many clients have requested that object, thereby reducing traffic on web severs and routers;
   said broadcast control server also being operative for selecting channels of said multichannel data transmitter for broadcast transmission of web objects downloaded in said caching server;
   wherein the channels are selected in such a way to evenly distribute data flows among the channels, thereby efficiently utilizing the bandwidth of channels allocated for Internet access;

said broadcast control server further being operative for assigning to each web object a flow number different from flow numbers assigned to other objects to be transmitted concurrently over the same channel;

said broadcast control server further being operative for producing an announcement of transmission of each web object, said announcement specifying a web identification of that object, a channel selected for transmission of that object and a flow number assigned to the object;

encapsulating the announcement into an announcement packet and transmitting the announcement packet over a channel known to Internet clients prior to transmitting the object itself;

said broadcast control server further being operative for instructing a channel server connected to the channel specified in the announcement to receive the web object specified in the announcement from said caching server and upload the object into the channel as a flow of content packets;

wherein the flow number specified in the announcement being included in the packet header;

so that all Internet clients that have requested the web object could download it simultaneously from the channel specified in the announcement;

thereby reducing traffic over said broadcast multichannel medium and as a result, further reducing delays in delivery of web objects to Internet clients;

at the recipient side, a multichannel data receiver connected to said broadcast multichannel medium; and an Internet client coupled to the multichannel data receiver for tuning the receiver to different channels and receiving data transmitted on those channels, and further connected to said two-way communication means for communicating with said broadcast control server;

said Internet client being operative for identifying a web object requested by client's user;

sending a request for that object to said broadcast control server over said two-way communication means;

tuning said multichannel data receiver to the channel over which announcements are transmitted;

selecting an announcement packet containing a web identification of web object requested by the user;

tuning said multichannel data receiver to the channel specified in the announcement;

selecting content packets with the packet header containing a flow number specified in the announcement;

reassembling the web object from the selected content packets; and presenting the web object to the user.

2. A system as defined in claim 1; and further comprising:

a network adapter for connecting said Internet client to said multichannel data receiver;

said network adapter having a network address and being operative for accepting packets transmitted with a destination address that is the adapter network address or a network broadcast address and passing the packets to the Internet client while rejecting all other packets;

thereby providing the Internet client with a network address; and wherein said channel server is operative for including in the packet header both a flow number and a destination address that is either a client network address or the network broadcast address depending on an instruction received from said broadcast control server;

thereby reducing the number of packets to be processed by each Internet client in order to distinguish a web object requested by client's user from other objects transmitted over the same channel.

3. A system as defined in claim 1 wherein said broadcast control server is further operative for instructing said caching server to retain a web object in a high demand until the demand lasts or the object is modified on its origin web server so to not deliver web objects each time from their origin servers whenever the objects are requested by Internet clients, thereby reducing delays in delivery of objects to Internet clients and further reducing traffic on web severs and routers.

4. A system as defined in claim 1 wherein said broadcast control server is further operative for sending an announcement of transmission of a web object over said two-way communication means only to those Internet clients which have requested that object and, if necessary, authorized for downloading of that object.

5. A system as defined in claim 4 and further operative for protecting of transmitted content against unauthorized reception by transmitting a web object as a flow of packets with a pseudorandomly changing flow numbers included in the packet header and providing a secret key to the pseudorandom process that generates the flow numbers to authorized Internet clients only.

6. A system as defined in claim 5 and further formed for protecting of transmitted content against unauthorized reception by transmitting packets of the same web object over pseudorandomly changing channels and providing a secret key to the pseudorandom, process of changing channels to authorized Internet clients only.

* * * * *